Feb. 6, 1968 H. E. MILLER 3,368,090
PORTABLE MOTOR DRIVEN POWER TOOL
Filed May 28, 1965 3 Sheets-Sheet 1
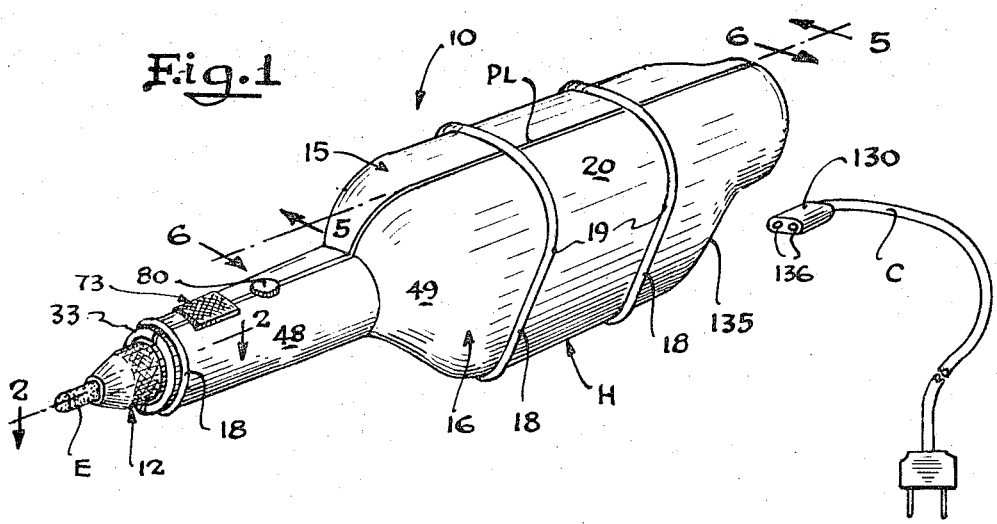
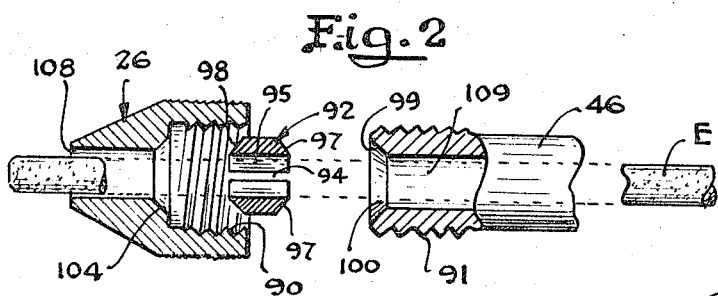
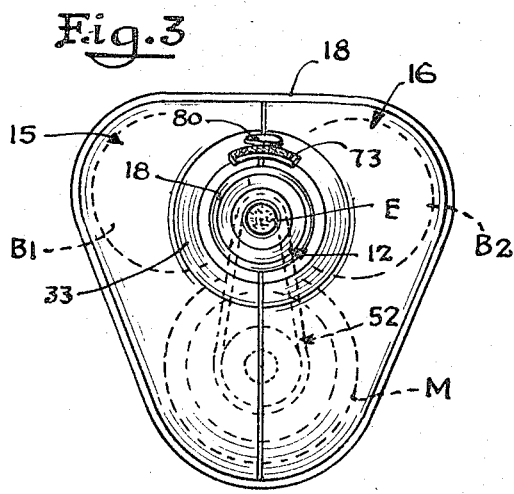
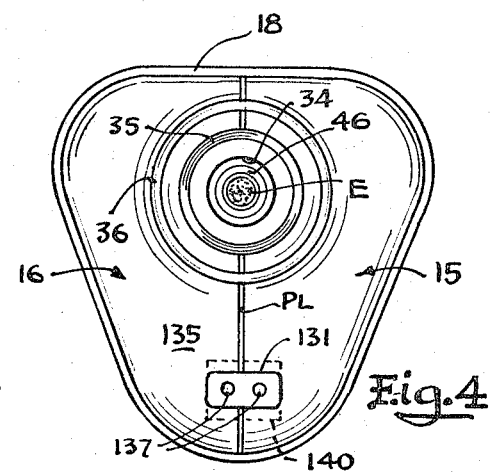
Inventor
Henry E. Miller
By Wallace, Kinzer and Dorn
Attorneys

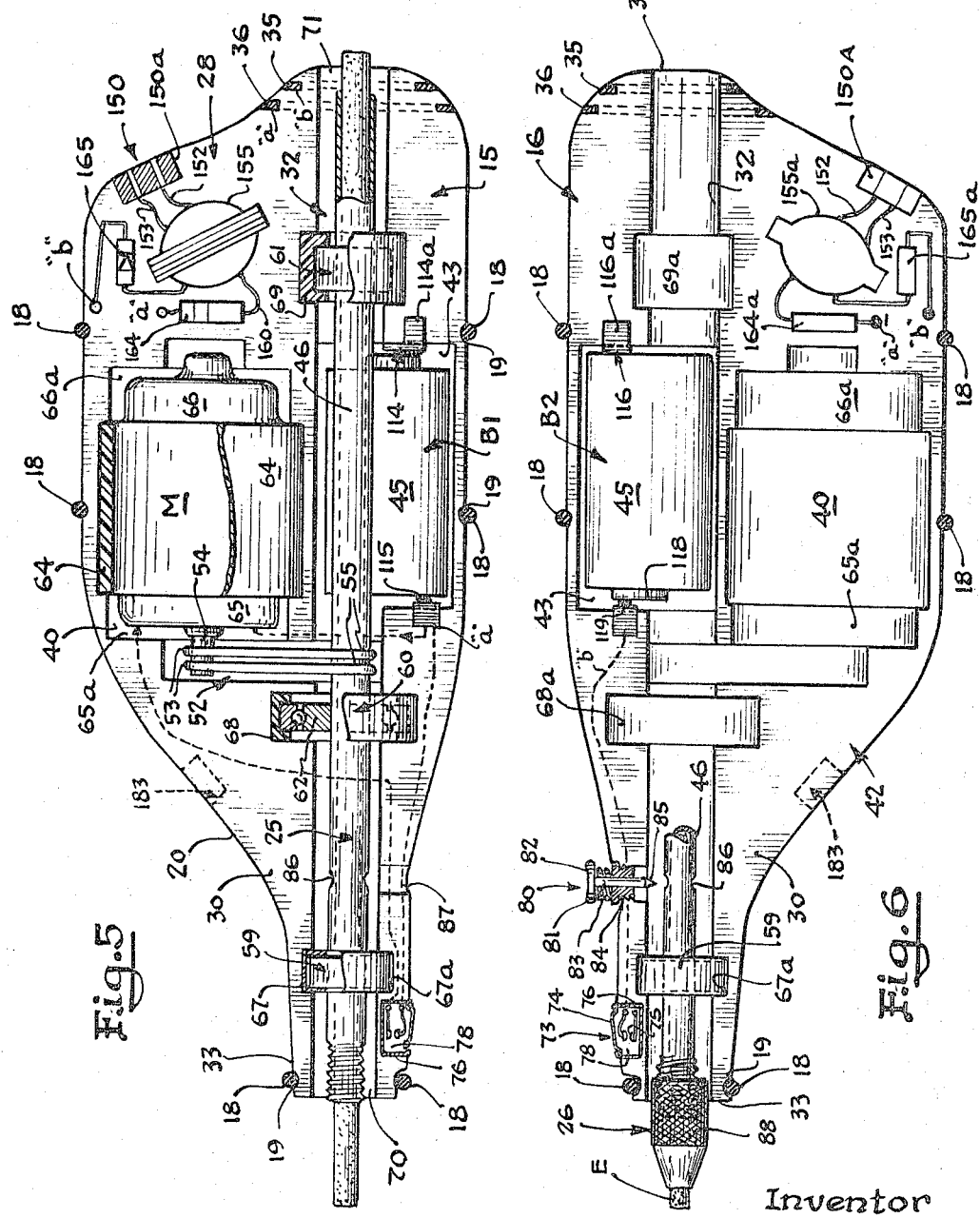

Feb. 6, 1968          H. E. MILLER          3,368,090
PORTABLE MOTOR DRIVEN POWER TOOL
Filed May 28, 1965          3 Sheets-Sheet 3
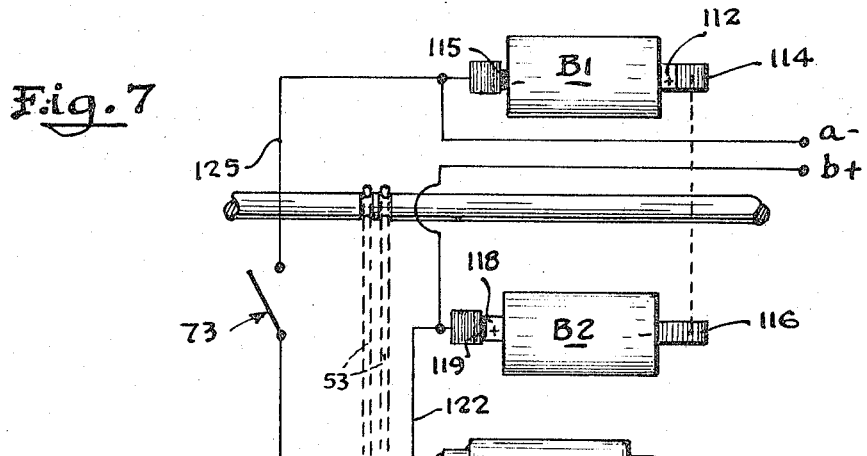
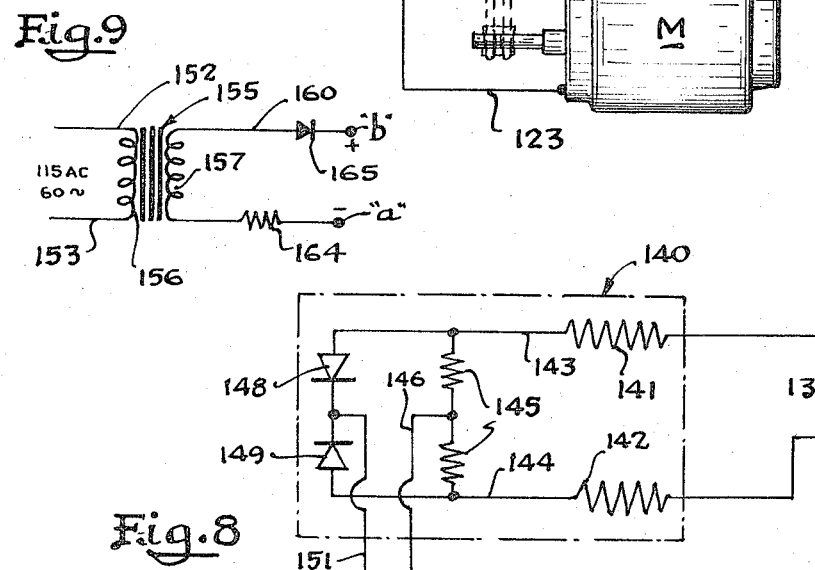
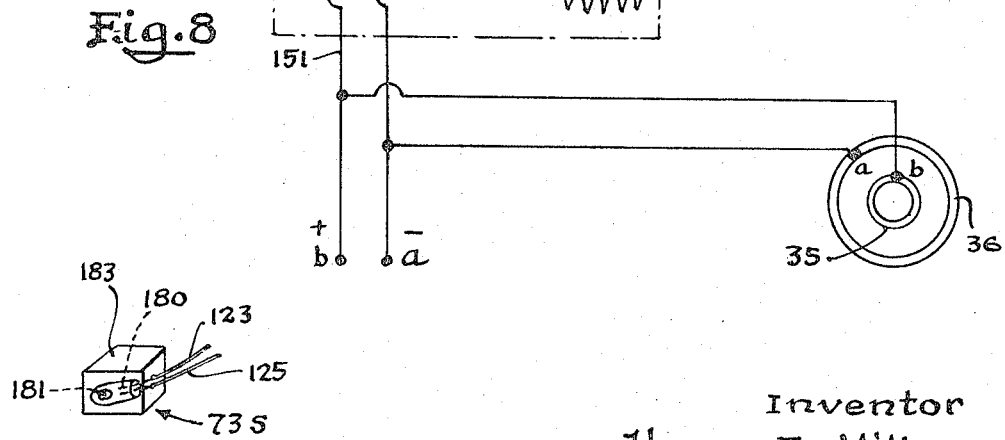
Inventor
Henry E. Miller
By Wallace, Kinzer and Dom
Attorneys United States Patent Office 3,368,090
Patented Feb. 6, 1968

3,368,090
PORTABLE MOTOR DRIVEN POWER TOOL
Henry E. Miller, Chicago, Ill., assignor to Chicago Wheel & Manufacturing Co., Chicago, Ill., a corporation of Illinois
Filed May 28, 1965, Ser. No. 459,868
5 Claims. (Cl. 310—51)

This invention relates to power tools and more particularly to relatively small and portable hand tools.

The present invention is directed to small, portable tools which are manipulated by an operator clutching the tool in his hand; and to tools which employ a small electric motor and a rotatable spindle element rotated by said motor. A major problem with small portable tools of the aforesaid description is the difficulty of servicing and/or repair of the tool by the user thereof who is relatively unskilled in servicing or repairing the tool. The tools of the prior art are typically constructed with the operating components secured to a metal housing by brackets and a plurality of small screws or rivets. The difficulty of assembly and disassembly has frequently resulted in the user returning the tool to the manufacturer or authorized service center for repair or servicing of the tool. The paper work involved, inventories, billing for such services and staffing of repair installation makes such repair and replacement of parts a costly process both for the manufacturer and for the customer. Delays in servicing or repair often result in customer dissatisfaction.

Accordingly, an object of the invention is to afford ready access to the operating components of a power tool and to enable operating components of a power tool to be readily replaced incidental to facilitating repair and replacement. Another object of the invention is a unique and generally solid housing composed of two or more elements securable together to form an exterior housing and having a plurality of internal cavities for receiving the operating components of the power tool.

Another object of the invention is to support components of a portable tool in a molded, shell-like housing of thermoplastic material thereby to eliminate, during the manufacture of the tool, expensive machining operations and expensive assembly operations.

A further object of the invention is to afford quiet operation in a power tool by almost total enclosure of the operating components within a relatively thick walled housing.

A more specific object of the invention is a new and improved construction of a portable tool having a split type of housing comprised of substantially mirror-image halves which may be separated to expose the internal components of the portable tool for replacement of self-servicing.

A further object of the invention is to improve the balance and handling characteristics of a power tool by separating the driving spindle, motor, and rechargeable batteries for the motor to enable the center of gravity of the tool to be located within the operator's hand. A more specific object of the invention is a cordless portable power tool having a motor separate from the spindle and having rechargeable batteries disposed on opposite sides of a driving spindle to improve the balance of the tool.

A further object of the invention is to dampen vibrations resulting from rotation of the motor and the rotation of the spindle by the motor. More specifically, alleviation of noise and/or vibrations emanating from a portable tool is accomplished by mounting the driving motor and/or spindle on isolation mounts in a generally enclosed housing. A further object of the invention is the reduction of gear or transmission drive noise by the employment of endless belts or rings as a drive between the spindle and the motor.

A further advantage achieved by the driving of the spindle by the use of such endless bands is the facilitating of the assembly and disassembly of a spindle and motor for replacement and this constitutes a further object of the invention. A portable power tool, constructed in accordance with a further object of the invention, has a housing assembly comprised of a pair of mirror image housing elements.

A specific object of the invention is a new and improved portable tool which is cordless, rechargeable, and includes a split housing having a plurality of cavities therein in which are nested separate units such as the batteries, motor and spindle, which units can be readily replaced merely by separating the split halves in the housing to expose aforementioned units for removal from the cavities in the housing.

Heretofore, many power tools were limited in flexibility because of their limited ability to hold various diameter tools or shanks of tools. Accordingly, another object of the invention is an inexpensive chucking device readily adaptable to chuck tools or shanks of tools of various diameters.

A still further object of the invention is a power tool having rechargeable energy cells or batteries and unique, connecting means in the tool housing for facilitating such recharging of the energy cells or batteries.

Another object of the invention is to afford an automatic and one-way clutching of the eraser by a simple and inexpensive apparatus.

Other and further objects of the present invention will be apparent from the following description and claims and are illustrated in the accompanying drawings which, by way of illustration, shows preferred embodiments of the present invention and the principles thereof and what is now considered to be the best mode contemplated for applying these principles. Other embodiments of the invention embodying the same or equivalent principles may be used and structural changes may be made as desired by those skilled in the art without departing from the present invention.

In the drawings:

FIG. 1 is a perspective view of a power tool constructed in accordance with the preferred embodiment of the invention;

FIG. 2 is an expanded and partial sectional view of a driving spindle and chucking assembly;

FIG. 3 is a front view of the tool of FIG. 1;

FIG. 4 is a rear view of the power tool of FIG. 1;

FIG. 5 is a sectional view taken along the line 5—5 of FIG. 1 in the direction of the arrows showing the internal components for the power tool within the respective cavities in a housing element;

FIG. 6 is a sectional view taken along the line 6—6 of FIG. 1 in the direction of the arrows and showing the opposite housing element and the cavities therein;

FIG. 7 is a schematic electrical diagram for the motor and tool drive;

FIG. 8 is a recharging circuit diagram for the rechargeable batteries;

FIG. 9 is another recharging circuit diagram for the rechargeable batteries; and FIG. 10 is a perspective view of a mercury switch unit for the power tool of FIG. 1.

Referring now to the drawings and more particularly to FIG. 1, there is illustrated a power tool 10 constructed in accordance with the preferred embodiment of the invention. In its preferred form, the power tool 10 is employed as a power driven eraser tool although the principles of the present invention are applicable to other kinds of power tools than power driven eraser tools. More specifically, the power tool 10 may drive cutting tools such as grinding wheels, saws, drills as well as the eraser E projecting forwardly from a chucking means 12, FIG. 1, at the forward end of the unit.

The power tool 10, in its preferred form, is a cordless type of power tool; and hence can be operated for extended periods of time free of a cord for connection to an electrical socket. The cord C illustrated in FIG. 1, is a recharging cord for the rechargeable batteries B1 and B2, FIGS. 5 and 6, which provide the electrical energy for rotating the eraser E to perform the erasing operation. The batteries B1 and B2 are commercially available batteries of the rechargeable type; and the cord C is preferably not connected to the power tool 10 while an operator is using the same.

An important aspect of the present invention is the construction of the housing H for the tool 10 which includes two mirror image housing elements or shells 15 and 16. The housing elements 15 and 16 are held together in face-to-face relationship along a parting plane PL extending longitudinally along the entire length of the housing H. The housing elements 15 and 16 are held in this interface relationship by securing means in the form of three resilient bands or rings 18 disposed in encircling grooves 19. The grooves 19 hold the rings or bands 18 against lateral movement along the outer surface 20 of the respective housing elements 15 and 16. Preferably, the bands or rings 18 are of a rubber or elastomeric material such that, when the tool 10 is lying on an inclined surface, such as a draftsman's table, the larger rings 18 are serving as friction retarding elements for holding the tool 10 against sliding movement.

As will be brought out more fully hereinafter, it is preferred that the endless bands 18 be the only locking or securing means holding the housing elements 15 and 16 together in assembled relationship. The endless bands 18 are easily removed from the grooves 19 and afford easy access to the interior components of the tool 10 for self-serving, repair or replacement of components by the user. More specifically, as will be brought out hereinafter in greater detail, the removal of the endless bands 18 permits the shell housing elements 15 and 16 to be opened into the general relationship shown in FIGS. 5 and 6, wherein the components comprising of the operating instrumentalities of the eraser are exposed for the inspection, service or replacement.

The main operating components readily seen for inspection, upon separating of the housing elements 15 and 16, include a self-contained electric motor unit M, a pair of batteries B1 and B2, a driving spindle and bearing assembly 25, a chucking means 12 and a transformer unit 28 for the batteries B1 and B2.

The housing shells 15 and 16 are preferably molded elements of a plastic, thermoplastic or organic material which can be readily molded under high production techniques to afford low-cost housing elements. Preferably, the housing elements 15 and 16 are solid walled elements from the outer exterior surfaces 20 to inner, flat planar surfaces 30, which are abutted at the mating plane PL when secured by the endless rings 18. More particularly, each of planar surfaces 30 is a flat surface with a large number of recesses or cavities formed therein to receive the operating units or instrumentalities hereinbefore listed. The operating units nest with the recesses of the housing elements 15 and 16 thereby eliminating the usual brackets and other fastening devices of prior art constructions.

It is preferred that the housing elements 15 and 16 be mirror images of one another with identical cavities therein. The present invention, however, in its broader aspects, is not to be construed as being limited to a power tool having a housing formed with mirror image housing elements inasmuch as it is possible to employ many of the principles of the present invention by affording housing elements of different configurations or with different cavities in their respective housing elements. An advantage gained in using identically shaped cavities is that the same core elements thereby assure the same tolerances for cavities and a more perfect fit of the cavities.

A principal cavity formed in each of the flat planar surfaces 30 is a longitudinally extending semi-cylindrical groove 32 of a semi-circular cross-section. This groove 32 extends from the forward barrel portion 33 adjacent the chucking means 12 for the eraser to the rearward recharging end 34 in which are a pair of recharging rings 35 and 36. As best seen in FIG. 5, the groove 32 is adapted to receive therein the spindle and bearing assembly 25 and an eraser E held within a hollow bore in the spindle 46.

A large motor recess or cavity 40, FIGS. 5 and 6, extends downwardly from each of the flat surfaces 30 into the solid portion of the body of the housing elements 15 and 16. This lower portion of the housing elements 15 and 16 in which the motor recess 40 is located may be termed the "belly" portion 42 of the power tool 10 in that it is a large rounded portion extending downwardly from the axis of the eraser E and spindle means 12. Also when the tool 10 is held in the operator's hand, the "belly" portion 42 is lowermost while the batteries B are uppermost. The batteries B are disposed in their respective cavities 43.

It is preferred that the two batteries B1 and B2 be employed as the energy source for the electric motor M. Thus, a battery B1 or B2 is shown in each of the respective housing elements 15 and 16. The recesses 43 for the respective batteries B1 and B2 are sufficiently deep so that the outer cylindrical surface 45 of the respective batteries B are free from interference engagement with a rotatable spindle or shaft 46 of the spindle and bearing unit 25. The spindle 46 is preferably hollow throughout its entire length.

Heretofore, it has been a common practice in the manufacture of power tools to have a spindle, such as the spindle 46, attached directly to the armature of a driving motor so that the spindle was in effect, the armature shaft as well as the spindle for driving the power tool. Such a conventional armature on the spindle arrangement for a power tool having rechargeable batteries or energy cells therein, results in a poorly balanced and longer power tool. With this kind of prior art tool, the center of gravity of the power tool is at a point rearwardly from the operator's fingers grasping the power tool and more rearwardly of the operator's fingers than with the preferred embodiment of the present invention.

Another important aspect of the present invention is the manner of driving the spindle 46 by the motor M through a non-positive driving means 52 preferably in the form of a pair of resilient endless bands or rings 53, FIG. 5. The endless bands 53 are slightly tensioned into driving relationship with a motor shaft 54 of the motor M, which shaft 54 has suitably formed grooves thereon for receiving a portion of the circular cross-section driving rings 53. The turning of the motor shaft 54 by the motor M causes the endless bands 53, which are in frictional and driving engagement with the motor shaft 54, to turn with the motor shaft 54 and in turn rotate the spindle 46. The use of a non-positive driving means 52 facilitates the connection and disconnection of the motor M to the spindle and bearing assembly 25. Thus, the motor M and spindle 46 are separable from one another for replacement of the motor unit or spindle and bearing assembly without requiring the use of any special tools. Additional advantages from the non-positive drive 52 is that it is relatively noise free in operation and will be subject to slippage, if the operator affords sufficient resistance to overcome turning the torque provided by the motor M.

As best illustrated in FIG. 5, the spindle 46 is journaled for rotation by a central bearing means 60, which is preferably a roller bearing, and is journaled at intermediate a pair of solid bearings 59 and 61. The bearings 59 and 61 may be of brass, nylon or other conventional bearing material. The roller bearing 60 has its inner race 62 so related to the spindle 46 that the removal of the spindle 46 is also accompanied by the removal of the bearing 60. The solid bearings 59 and 61 are also adapted for removal as part of the bearing spindle assembly 25. When the operator detects a defective bearing or shaft, the operator will simply replace the whole of the bearing and spindle assembly 25 by merely setting its replacement assembly 25 in place in the groove 32. This replacement is simply and easily performed without the use of any tools or return of the eraser to the factory.

A problem with conventional power tools has been the generation of considerable vibrations and noise during the operation of the tool. To alleviate the transmission of vibrations and to reduce its noise level, the power tool 10 of the present invention provides a series of isolation mounts for the motor M and the bearing and spindle assembly 25. More specifically, the motor M is provided with an isolation mounting sleeve 64, which encircles the motor M and which is disposed in the motor recess 40. The end bells 65 and 66 of the motor are shown spaced from the recesses 65a and 66a therefor in the respective bearing halves 15 and 16. Thus, the motor M is isolated from direct contact with the housing H. Hence, any vibrations from the motor M are damped or isolated by the rubber isolation sleeve 64 from going directly to the respective housing elements 15 and 16. In a similar manner the spindle 46 is separated by an annular air space of the groove 32 to prevent vibrations from the rotating spindle from transferring to the housing elements 15 and 16. The bearings 59, 60 and 61 are provided with isolation sleeves 67, 68 and 69 disposed in the bearing cavities 67a, 68a and 69a, so as to prevent the transmission of vibrations from the shaft 46 and bearings 59, 60 and 61 to the housing halves 15 and 16.

The noise problem is alleviated by a construction of the power tool, in accordance with the preferred embodiment of the invention, wherein the operating and turning components such as the motor M, drive means 52, and spindle 46 are almost totally enclosed within the housing H except at the inlet opening 70 and an outlet opening 71 for the groove 32. The housing elements 15 and 16 are thick walled and of an insulating material. It is preferred that the motor M rotated at a relatively slow rate of approximately 3,000 r.p.m., as contrasted with a much higher rate for the other types of power tools. The slower operating speed results in less operating noise from the motor. The motor M can be thus enclosed without serious heat problem being encountered because of the low duty cycle for the motor when it is employed as an eraser. The usual erasing operation will be of a period of seconds rather than prolonged and longer periods of time, as when grinding, drilling or sawing. The present invention, however, is not to be construed as limited to a power driven erasing tool inasmuch as the illustrated tool can be employed to handle the small cutting, drilling or grinding tools employed in hobby craft and model making. Additionally, many of the principles of the present invention, as set forth in the appended claims, are applicable to a more heavy-duty cycle motor for typical grinding and cutting operations, merely by providing a higher speed motor and suitable ventilation openings in the housing H for dissipation of the heat generated by the motor M.

The period of operation of the motor M may be controlled by a push button type of switch 73, FIGS. 1 and 6. Depression of the switch button 74 closes a pair of normally opened contacts 75, FIG. 6, to complete an electrical circuit from the rechargeable batteries B1 and B2 to provide the electrical energy source for energizing the coils of the motor M. The push button switch 73 is preferably a self-contained unit having a housing 76 disposed within a suitable cavity 78 formed in the flat planar surface 30 of the respective housing elements 15 and 16. If desired, the switch 73 can be of the self-latching type, to provide both momentary or prolonged operation, at the option of the operator.

The switch 73 may be of various constructions. A mercury switch 73S, FIG. 10, is one such construction; and is the preferred form on the switch. Thus, the mere tilting of the tool 10 to bring the tip of the eraser E downwardly towards a surface to be erased causes the mercury to afford a conductive path between two previously open contacts. More particularly, the mercury switch 73S, as illustrated in FIG. 10, has a pair of leads 123 and 125 which terminate within the interior of a glass envelope 180 in which is disposed a ball of mercury 181. Tilting of the tool 10 in one direction moves the ball of mercury into engagement with the ends of the leads 123 and 125 completes electrical circuit therebetween. Tilting of the tool 10 in the opposite direction moves the ball of mercury from the leads 123 and 125. The glass envelope 180 may be a suitably shaped housing element 183 adapted to be disposed in the cavity 78. Such a mercury switch affords an inexpensive and relatively trouble free unit which can be readily replaced, if desired.

When loosening or tightening the chuck 26 for the eraser tool E, the spindle 46 is held against rotation by a detent means 80. The detent means 80 includes a spring biased plunger element 81 having a head 82 exposed for depression by the operator. Disposed beneath the head 82 of the plunger element 81 is a compression spring 83 for biasing the plunger element 81 upwardly. The compression spring 83 rests on an externally threaded plug 84, which is adapted to be threaded into a groove 87 formed in the flat cylindrical surfaces 30. The cylindrical groove 87 extends from the exterior of the housing into the longitudinally extending groove 32. The plunger element 81 has a pointed head 85, which is adapted to be inserted into one of a plurality of detent sockets or recesses 86 formed on the exterior peripheral surface of the spindle 46 and aligned with the pointed head 85. Thus, the depression of the detent element 81 moves the head 85 into a detent opening 86 to lock the spindle shaft 46 against turning movement while the operator exerts a turning torque on the knurled outer surface 88 of a chuck element 26.

The chuck element 26, as best seen in FIG. 2, includes a large internal bore 90 which is internally threaded for threaded engagement with the external threaded portion 91 of the hollow spindle 46. A split chuck nut 92 is adapted to be disposed within the bore 90 of the chuck element 26 and to be disposed about the eraser tool E. The split nut 92 is a generally circular element being split by a groove 94 so that the inner diameter bore 95 of the nut 92 can be reduced to frictionally grip the eraser E and hold the same against longitudinal movement.

To compress the split nut 92 into tight engagement with the eraser element E or the shank of a cutting tool, the nut 92 is provided with opposed inclined and annular surfaces 97 and 98. The inclined surface 97 is disposed for camming and sliding engagement with the inclined surface 99 in the bore 100 formed at the end of the spindle 46. Likewise, the inclined and annular surface 98 on the nut 92 is for camming and sliding engagement with the inclined and annular surface 104 formed at the end of the bore 90 in the chuck element 26. The chuck element 26 has a smaller diameter bore 108 extending longitudinally from the bore 90 and through which the tool such as the eraser E is disposed.

When inserting a new eraser E into the tool, the chucking lement 26 is turned outwardly along the threaded portion 91 of the spindle 46 while the detent plunger 81 is holding the spindle 46 against turning. As the chucking element 26 moves longitudinally off of the driving spindle 46, that is leftwardly as viewed in FIG. 2, the inclined surfaces 104 and 100 lose their camming engagement with the inclined surfaces 97 and 98 on the chucking nut 92 thereby permitting the chucking nut 92 to expand. The eraser E may then be inserted into the bore 46 and moved rearwardly in a longitudinal direction while the nut 92 is expanded. When it is desired to grip the eraser E, the chucking nut 92 is run rightwardly as viewed in FIG. 2, along the external thread 91 of the driving spindle 46 to cause the camming surfaces 104 and 100 to engage the respective camming surfaces 97 and 98 on the chucking nut 92 thereby changing the diameter of the bore of the chucking nut 92 and forcing the nut 92 into tight frictional engagement with the eraser E. The chucking nut 92 is thus held tightly by the chucking element 26 and the spindle 46 along its inclined surfaces 97 and 98 so as to rotate with the spindle 46 and drive the tool E. That is, the chucking nut 92 is coupled to the rotating spindle 46 for rotation therewith when its camming surfaces 97 and 98 are in tight engagement with the camming surfaces 99 and 104, respectively.

The chucking means 12 employed in the present invention as hereinabove described affords the advantage of a one-way clutch or friction device which permits the operator to pull automatically the eraser from the bore of the spindle 26 after the eraser is worn. More specifically, the pulling on the eraser by the operator reduces the diameter of the rubber eraser within the chuck nut 92 so that the eraser may be pulled outwardly. When the operator releases the eraser, the eraser element within the chuck nut 92 expands and once again is properly clutched or connected by the chuck nut 92 to the driving spindle 46. Also, it will be seen that during an erasing operation the forces on the tip end of the rubber eraser E is directed rearwardly to compress and expand the diameter of the eraser forwardly of the chuck nut 92 to prevent the rearward movement of the eraser in the bore of the spindle 46. Thus, the chucking means 12 affords automatic adjustment of the eraser length merely by pulling the eraser forwardly through the chuck nut 92 without the necessity for loosening or tightening the chucking element 26.

It is within the purview of the present invention to provide different sizes of locking nuts 92 with different diameter bores so that the power tool can be used with various diameters of erasers, or for tool shanks of various types of tools. That is, chucking nuts 92 with appropriate size internal bores may be provided with the power tool 10 for chucking different diameter shanks of a cutting tool, grinding tool, etc.

It will be recognized that a number of different types of commercially available batteries or energy cells are commercially available on the market to supply the required type of rechargeable source of electric current and voltage. The power tool 10 can be employed with a recharging stand (not shown) which is a separate receptacle in which the eraser will be held in a generally upright position with the eraser tip E of the chuck means 12 uppermost. In this position, the metallic recharging rings 35 and 36 are adapted for suitable electrical contact with charging rings from the recharging stand. It may be stated generally that the recharging rings 35 and 36 are relatively high current recharging rings and the batteries B1 and B2 are being continually recharged with each return of the power tool 10 in the recharging rings 35 and 36 are constituted by individual and separate semi-circular ring elements disposed in each of the housing elements 15 and 16.

As best seen in FIG. 5, the recharging rings 35 and 36 are connected to electrical leads *a* and *b*, respectively. The actual connection of the wire leads is diagrammatically illustrated in FIG. 7 as leads *a* and *b* leading to the respective batteries B1 and B2. The negative polarity lead *a* is connected to the negative terminal of the battery B1 in the housing element 15. The positive pole 112 of the battery B1 is in engagement with a clip 114 which is preferably made of spring metal extending into the cavity 43. The spring metal clip 114 is an electrical conductor and serves to bias the battery B1 against an opposite spring metal clip 115 also inserted at the opposite end of the battery cavity 43 and housing element 15. The metallic clip 114 has a right angled portion 114*a* in flush engagement with the mating surface 30 of the housing element 15 for contact with a similar situated portion 116*a* of a similar clip element 116 in the housing element 16. The clip element 116 is in engagement with the negative side of the battery B2. It is to be understood that the dotted line in FIG. 7 illustrates a mechanical contact between the clip elements 114 and 116 when the housing elements 15 and 16 are pressed into engagement by the retaining bands 18.

A positive pole 118 of the battery B2, FIG. 7, is in engagement with a clip element 119 with FIGS. 6 and 7 at the opposite end of the cavity 43 in the housing element 16. The positive lead *b* from a rectified current source is connected to the battery B2 at the clip element 119. As best seen in FIG. 7, the clip element 119 at the positive pole 118 of the battery B2, is connected by a lead 122 to one side of the motor winding of the motor M, FIG. 7, while another lead 123 leaves the motor winding of the motor M, and is connected to the switch 73. Another lead 125 from the push button switch 73 is connected to a lead 125 leading to the clip element 115 for the negative pole of the battery B1. Thus, an obvious circuit for the motor M is completed with the closure of the push button switch 73, which circuit includes the now closed, switch 73, lead 125, clip element 115, battery B1, clip element 114, clip element 116, battery B2, clip element 119, lead 122, motor M, and lead 123 to the now closed switch contact 73.

It is within the purview of the present invention that the electrical leads hereinbefore described be small wire elements which need not have a groove or channel formed within the flat surfaces 30 of the respective housing elements 15 and 16. However, if it is desired, the flat mating surfaces 30 and of the housing elements 15 and 16 may be provided with a series of suitable, small, semi-circular recesses in each of the flat surfaces 30, such recesses and circuit leads therein are indicated in dotted lines in FIGS. 5 and 6. Manifestly, other types of electrical connections between the respective electrically connected elements can be made within the exercise of mechanical skill, and still fall within the purview of the present invention.

When a recharging cord C is employed, it is preferred that the cord C have a receptacle type of connector 130 at the end of the recharging cord for insertion into a complementary shaped cavity 131, FIG. 4, formed in the housing elements 15 and 16 at the rear, contoured surface 135 at the rear of the wide portion 50 of the power tool 10. Preferably the connector 130 has internal terminal connecting elements 136 for contacting and encircling each of a pair of pins of 137 of a rectifier pack 140. The pack 140 is disposed to have its pins 137 on opposite sides of the parting plane PL, as best seen in FIG. 4. The rectifier pack 140 is a small cube size element of the general dimensions outlined in FIG. 4. The components within the rectifier pack 140 are illustrated in FIG. 8 as containing a pair of large resistors 141 and 142 for connection to the respective pins 137. Each of the respective resistors 141 is connected by a lead 143 and 144, respectively, to a pair of circuit dividing resistors 145 which are center-tapped by a lead 146. The lead 146 is shown as the *a* or the negative lead. The leads 143 and 144 are also connected to a pair of suitable diodes 148 and 149, which are center-tapped by a lead 151 which forms the positive lead *b*. As seen in FIG. 8, the charging rings 35 and 36 are also connected to the respective *a* and *b* leads so that either the cord C or the recharging stand may be used as an alternative manner of supplying DC current to the rechargeable batteries B1 and B2.

The above described rectifier supplies about 4 to 12 milliamps of DC current and thus is a relatively low current rectifier. However, the preferred form of a rectifying device for the rectifier 140 converts a 115 volt, 60 cycle alternating current into DC current of approximately 120 milliamps, is illustrated in FIGS. 5, 6 and 9. In this instance, the charging cord C would be connected to the receptacle element 150, FIG. 5, disposed in a recess 150a, FIG. 6, in each of the flat planar surfaces 30 of the respective shell housing elements 15 and 16. Suitable leads 152 and 153 in the terminal 150 would connect the AC power source to the primary side of a transformer 155, FIGS. 5 and 9. The secondary coil 157, FIG. 9, of the transformer 155 has an output lead a, which is a negative lead, with a resistor 164 for connection to the clip 115 of the B1 battery. Another output lead 160 from the secondary transformer coil 157 has a diode 165 and extends to positive polarity lead b. Thus, the positive lead b may be connected to the clip 119 leading to the negative side of the rechargeable battery B2 in the shell housing element 15.

Suitable cavities, as illustrated in FIG. 6, namely transformer cavity 155a, resistor cavity 164a and diode cavity 165a are formed in the flat mating surfaces 30 of the respective housing elements 15 and 16 for receiving their appropriately sized components.

From the foregoing, it will be seen that a number of different manners of recharging the energy cells or batteries are possible under the present invention. Also from the foregoing, it is seen that a power tool constructed in accordance with the principles of the present invention is light-weight and is better balanced because of the distribution of the weight of the batteries and the motor being forwardly toward the fingers of the hand when the fingers are gripping the power tool. A further advantage of a power tool under the present invention is the elimination of excessive noise because of the almost totally enclosed motor and the vibration and noise isolation afforded by the isolation mounts for the rotating elements.

Another important aspect set forth in greater detail hereinbefore is the manner of employment of the present power tool for a number of different tools such as an eraser, drills and grinding elements and cutting elements having various diameter tools or tool shanks. Different diameter tools or tool shanks may be readily accommodated and gripped with the chucking device by employment of various sizes of bores in a chucking nut. Moreover, the chucking means 12 provides automatic, one-way gripping of the reaser so that the eraser tip may be easily pulled from the interior of the housing.

A most important aspect of the present invention is the elimination of the servicing, cost to the manufacturer and the time delay in sending an eraser to the manufacturer for repair. More specifically, in the present invention the operating components are separated into small and replaceable units such as the motor and driving spindle assemblies. An impositive drive connection between the motor assembly or unit and the driving spindle units provides an easy disconnection of the motor from the drive spindle while affording the advantage of a quiet drive for the spindle. Also in accordance with the preferred embodiment of the invention, the entire housing and supporting structure for the entire eraser and all the elements thereof is afforded by two housing elements which may be mirror images having substantially identical configurations.

Hence, while preferred embodiments of the invention have been described and illustrated, it is to be understood that they are capable of variation and modification.

I claim:

1. In a portable tool constructed to reduce the amount of noise and vibrations emanating therefrom during the use of said power tool comprising: housing elements of molded material having an exterior outer surface for gripping by an operator and having interior, flat surfaces for mating engagement one with another, cavities formed in said flat surfaces and being confined interiorly of said housing elements except for a longitudinal cavity for said tool, shaft means disposed in said longitudinal cavity and for rotating said tool, bearing means for rotatably supporting said shaft means, first isolation means disposed in aligned cavities formed in said housing elements, said isolation means engaging said bearing means to support said bearing means and to alleviate vibration of said housing means with rotation of said shaft means, motor means disposed in cavities formed within the interior of said housing elements, second isolation means mounted in said motor cavities in engagement with said motor means for isolating said housing elements from vibrations of said motor means, and endless band means extending between said motor means and said shaft means for rotating said shaft means and thereby said tool.

2. The tool of claim 1 wherein said housing elements have encircling grooves receiving endless bands encircling the exterior of said housing elements to hold said housing elements in aligned relationship to each other, said endless bands being of a friction material to exert a frictional force to hold said tool against sliding on a surface.

3. In a tool according to claim 1, battery means being disposed in selected ones of said cavities and being connected to said motor means for providing the electrical energy for said motor means.

4. A tool according to claim 1 wherein said shaft means is in the form of a hollow spindle driven by said motor means for rotation therewith, chucking means including an expandable, ring member for insertion over a portion of the tool inserted in said driven spindle, and a threaded chucking member for threaded connection to said driven spindle and for collapsing said ring member to grip frictionally said tool, and detent means for engaging said spindle to hold said spindle while a turning torque is applied to said chucking member.

5. The tool of claim 1 wherein said first and second isolation means are sleeves of a resilient material.

References Cited

UNITED STATES PATENTS

| 1,990,035 | 2/1935 | Kratz | 310—75 |
| 2,123,339 | 7/1938 | Misuraca | 310—50 |
| 2,242,475 | 5/1941 | Misuraca | 310—50 |
| 2,436,540 | 2/1948 | Allenby | 310—50 |
| 2,965,774 | 12/1960 | Rangus | 310—50 |
| 3,121,813 | 2/1964 | Pratt | 310—50 |
| 3,196,298 | 7/1965 | Kent | 310—50 |

OTHER REFERENCES

Electrical South, a W.R.C. Publication, December 1961.

MILTON O. HIRSHFIELD, *Primary Examiner.*

J. D. MILLER, *Examiner.*